United States Patent [19]

Alexander

[11] Patent Number: 5,309,506
[45] Date of Patent: May 3, 1994

[54] PERSONAL SERVICES TELEPHONE HANDSET AND SYSTEM

[75] Inventor: Thomas T. Alexander, Columbus, Ohio

[73] Assignee: Forerunner Corporation, Columbus, Ohio

[21] Appl. No.: 782,645

[22] Filed: Oct. 25, 1991

[51] Int. Cl.$^5$ .................. H04M 11/00; H04M 11/04
[52] U.S. Cl. ........................... 379/95; 379/37; 379/44; 379/45; 379/97
[58] Field of Search ............ 379/37, 44, 45, 52, 379/93, 95, 96, 97, 98, 355, 357, 369, 413; 340/531, 506, 514, 525, 528, 534, 539

[56] References Cited

U.S. PATENT DOCUMENTS

| 4,086,434 | 4/1978 | Bocchi | 379/97 |
| 4,153,822 | 5/1979 | Ueda et al. | 379/369 |
| 4,413,158 | 11/1983 | Danford | 379/357 |
| 4,647,914 | 3/1987 | Alexander | 379/44 |
| 4,675,653 | 6/1987 | Priestly | 379/95 |
| 4,720,855 | 1/1988 | Ohnishi et al. | 379/355 |
| 4,742,336 | 5/1988 | Hall et al. | 340/531 |
| 4,785,420 | 11/1988 | Little | 379/52 |
| 4,866,764 | 9/1989 | Barker, III | 379/355 |
| 4,926,459 | 5/1990 | Advani et al. | 379/52 |
| 5,153,906 | 10/1992 | Akiyama | 379/357 |

FOREIGN PATENT DOCUMENTS 63-275248  11/1988  Japan .................... 379/369

Primary Examiner—Curtis Kuntz
Assistant Examiner—Jason Chan
Attorney, Agent, or Firm—Mueller and Smith

[57] ABSTRACT

A telephone handset is described having an array of personal service buttons thereon employed by the user to carry out microprocessor controlled communication with a personal services facility. In an access mode of operation, by depressing one button, the handset will carry out dialing followed by an automatic protocol interaction and a subsequent transmission of account code specific to the user. The program then enters an interactive mode wherein the pushbuttons of the handset can be used for A VRS activity. Programming of the handset can be carried out by the dealer or at the user facility itself through the utilization of a small simple keypad which is coupled to the handset for that purpose. When combined with a security console, a priority protocol is established wherein security related signals are given precedence over handset activity.

13 Claims, 12 Drawing Sheets

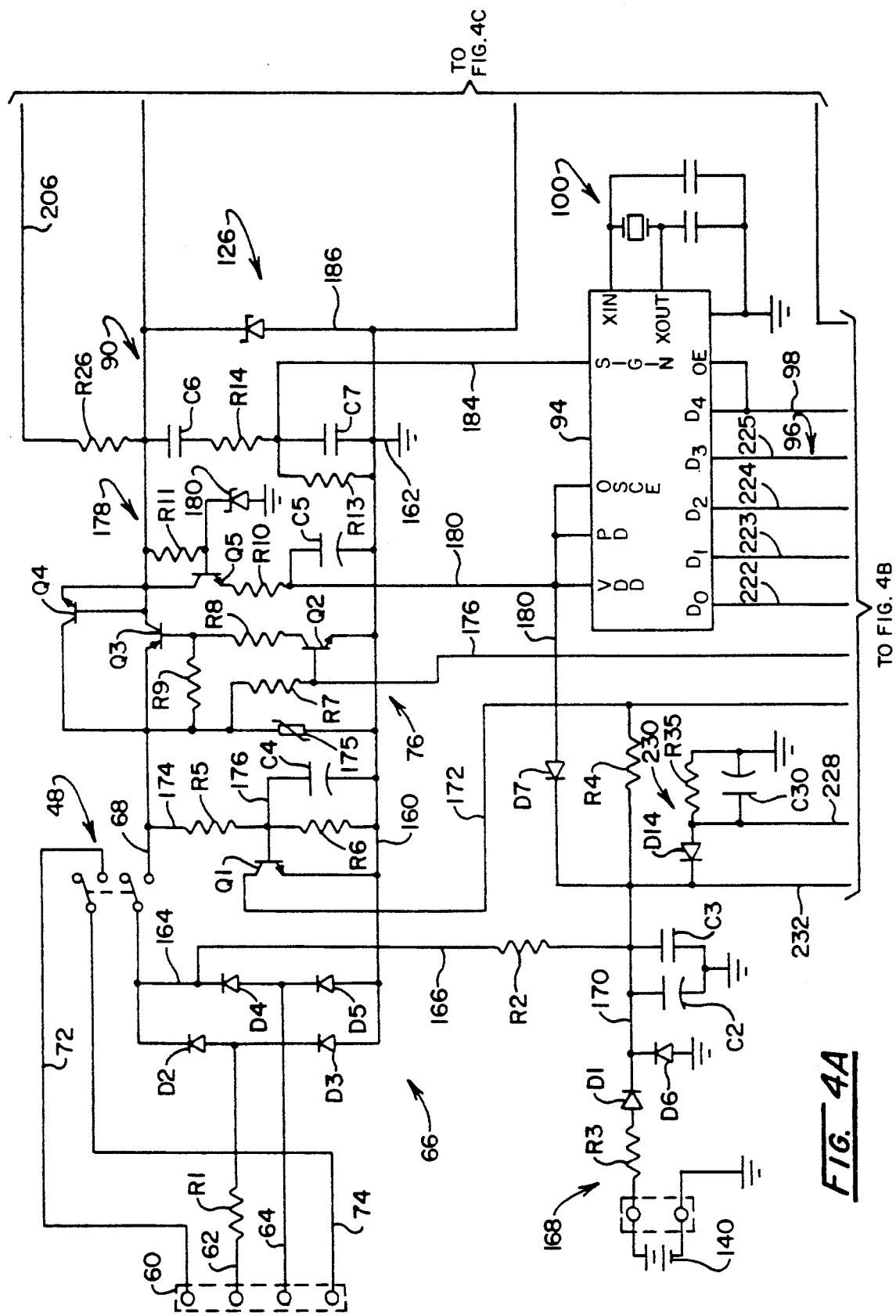

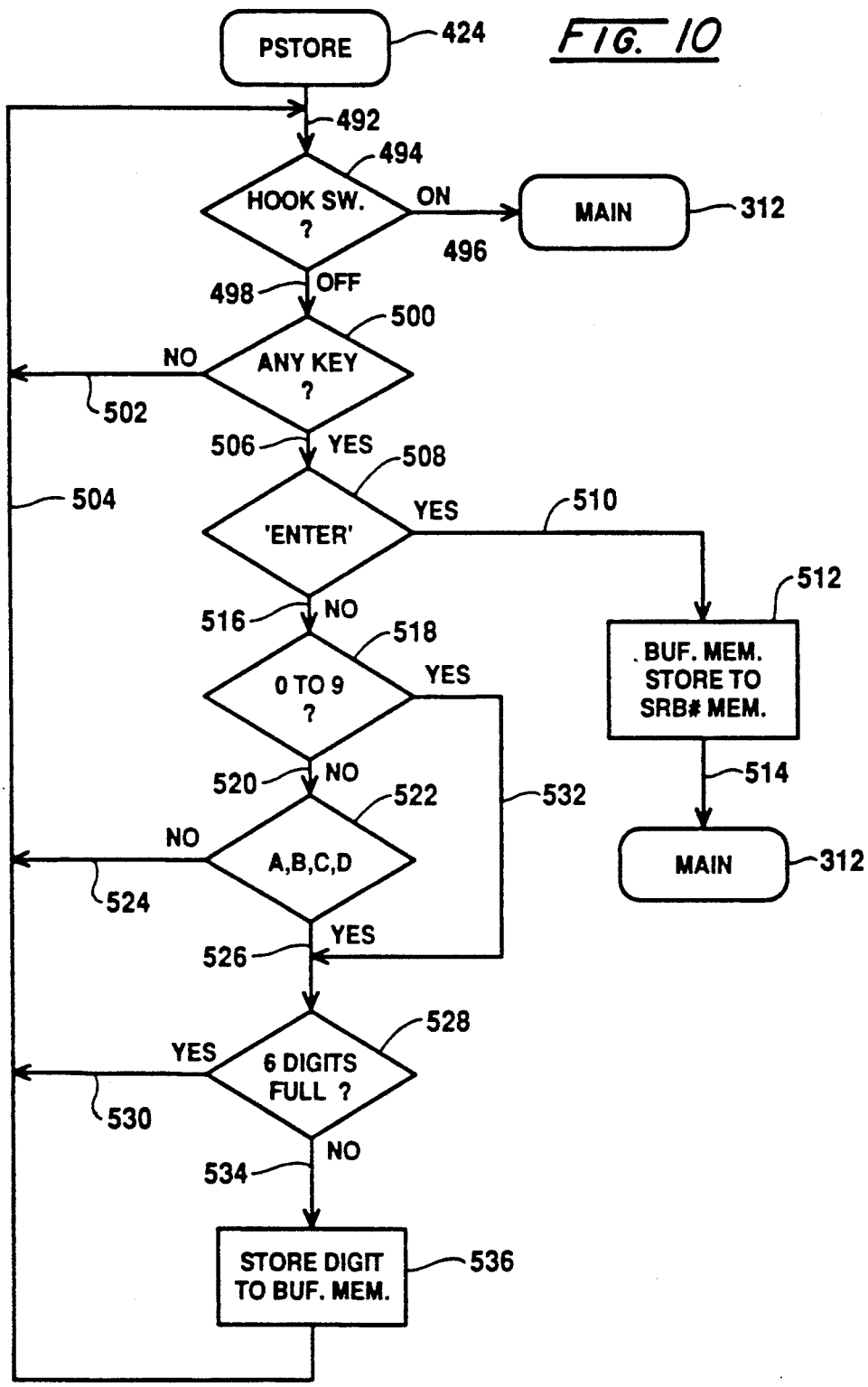

PERSONAL SERVICES TELEPHONE HANDSET AND SYSTEM

BACKGROUND OF THE INVENTION

The telecommunications industry has evolved from the provision of conventional telephonic services to a continuously and rapidly expanding range of communication services. Telecopier communication has become commonplace on a world-wide basis as well as personal computer based messaging networks. The relative simplicity of telephonic communication has led to the development of sales and service organizations wherein the conventional retail point of sale at a store or the like has been supplanted by a telephone operator or order taker and the ubiquitous personal credit card. Generally, the activities of the telephone order taker increasingly have been lessened or supported in the interest of time-based efficiency by Automatic Voice Response Systems (A VRS) wherein computer controlled, menu-driven voice communication is developed with the customer. With these developing communication activities, the point of sale is moved from a retail store to a communications center, and, in effect, to the home.

Customization of the home telephone service has commenced to occur. For example, home security systems are provided wherein the outputs of intrusion sensors as well as medical or similar emergency alarms are transmitted telephonically to centralized monitoring services with the use of auto-dialing or with dial dedicated telephone numbers such as "911". Services and sales organizations now seek to further improve these home communications techniques through the development of more efficient interaction between the home user and the personal services entity. This calls for simplicity in initiating communication, as well as to the automation, where feasible, of customer specific information, including the elimination of as many steps and procedures as possible on the part of the customer in concluding a transaction. The number of services available with this automated or semi-automated communications approach are extensive in scope incorporating, for example, travel services, banking, stock brokerage functions, retail sale operations in conjunction with television programs and the like.

A need for simplicity in the carrying out of communication particularly becomes apparent in such fields as "up and about" and "latchkey" monitoring. With the former service, elderly or disabled people living alone or in a secluded region dial a monitoring center at an appointed time during the day. A software based system functions to alert monitoring personnel for human intervention in the absence of such an incoming call. The latter, "latchkey" service monitors the arrival of a child at an empty home following school. A similar response action takes place in the absence of an incoming fall from the child within a preselected window of time. The procedure for placing such calls should be quite simple. The caller should not be required to recall a telephone number to be dialed, nor be called upon to carry out the physical act of dialing. Further, information concerning the call and caller needs to be conveyed without effort.

SUMMARY

The present invention is addressed to a telephonic personal services handset and a system combining the handset with a security monitor console which is placed within a home or user facility. The handset is fashioned having a hand-held component containing a conventional microphone and speaker arrangement which cooperates with a microprocessor driven control network functioning, in turn, in conjunction with a series of service request buttons. These service request buttons, when pressed, cause the control network to enter an access mode generating telecommunication with a select personal service facility. This communication is developed by carrying out dialing, the establishment of interactive protcol, and the transmission of a personal account code. An interaction mode then ensues permitting the handset pushbutton array to be used for the transmission of numerical information in the course of A VRS activity. When the handset is used for such purposes as "up and about" or "latchkey" monitoring, the user need perform no other activity than taking the handset "off hook" and pushing a single button.

When combined with a security console, a display panel on the latter will be illuminated to indicate handset utilization. Additionally, in the event of a security or alarm signal generation from monitors or the like within the home or facility, the console control program will override any handset utilization to carry out contact with an alarm facility on a first priority basis. In the event a personal service bureau wishes to contact the user, the same handset perceptible indicator on the console can be activated in a different energization mode, for example flashing, to prompt the user to pickup the hand-held component of the handset and activated a specific button.

Another feature of the invention provides a telephonic handset for telephonic communication through a telephone system line with service facilities having predetermined telephonic access numbers, account code data, and access protocol codes. The handset includes a housing assembly having a hand-held component and a hook switch, which is user actuable to have on-hook and off-hook states. A microphone and speaker are mounted with the housing assembly hand-held component for interactive sound communication with a user. A plurality of discrete service request actuators are mounted upon the housing assembly and each is associated with a select one of the service facilities and is manually actuable to effect derivation of a corresponding service code in an access mode and to effect derivation of a number signal in an interactive mode. A speech and signaling network is coupled with the microphone, receiver, and the telephone system line which has a DTMF input and a mute function input. Additionally, a DTMF decoder network is provided which is coupled with the telephone system line and which provides a digital output. Memory is provided for receiving and retaining account codes and service facility telephone numbers and a control arrangement within the handset is coupled with the memory, the service request switches, the speech and signaling network DTMF input, and the mute function input as well as the DTMF decoder network. The control responds to a program mode input for entering a programming mode and is responsive in the programming mode to an applied select service code, an applied predetermined telephonic access number, and an applied account code corresponding with the account code data for effecting their transfer to the memory. The control is responsive in the presence of the off-hook state to a first received service request switch service code for entering the access mode and, during the access mode, accessing the memory for a corresponding account code and corresponding predetermined telephonic access number for effecting the calling and telephonic communication with a select service facility at the predetermined telephone access number. The control is subsequently responsive to the receipt of the access protocol code from the service facility as a digital output from the DTMF decoder network for effecting the transmission of the account code the control further is responsive to the transmission of the account code to enter the interactive mode and is responsive in the interactive mode to a number signal to effect the transmission thereof to the select service facility.

Another feature of the invention provides a system for a user facility having secure and unsecure conditions which are monitored by detector devices deriving alarm signals in the presence of an unsecure condition for transmission through a telephone system line to a security monitoring service having an alarm response capability, and the system further providing telephonic interactive communication through the telephone system line with a personal service facility having a telephonic access number, account code data associated with the user facility and an access protocol code. With the system, a console is positioned within the user facility for receiving the alarm signals, the console having a control circuit including a communication network connectable with the telephone system line for select digital telephonic communication with the security monitoring service in response to one of the alarm signals and further having a display and user control input panel. A telephonic handset is provided having a housing assembly connectable for support by the console which includes a hand-held component and a hook switch actuable to have on-hook and off-hook states. A microphone and speaker are mounted with the housing assembly hand-held component for interactive communication with a user. The handset further includes a plurality of discrete service request switches mounted thereon and each associated with a select one of the personal service facilities and manually actuable to effect derivation of a corresponding service code in an access mode and to effect derivation of a number signal in an interactive mode. A speech and signaling network is coupled with the console control circuit to the telephone system line and has a DTMF input and a mute function input. A DTMF decoder network is coupled with the console control circuit to the telephone system line and has a digital output. Memory is provided for receiving and retaining account codes and personal service facility telephone numbers. Further, a control is coupled with the memory, the service request switches, the speech and signaling network DTMF input and mute function input and the DTMF decoder network. This control is responsive to a program mode input for entering a programming mode and is responsive in the programming mode to an applied select service code, an applied predetermined telephone access number, and an applied account code corresponding with the account code data for effecting their transfer to the memory. The control further is responsive in the presence of the off-hook state to a first received request switch service code for entering the access mode and, during the access mode, accessing the memory for corresponding account code and corresponding predetermined telephonic access number for effecting the calling and telephonic communication with a select service facility at the predetermined telephonic access number and subsequently is responsive to the receipt of the access protocol code from the facility as a digital output from the DTMF decoder network for effecting the transmission of the account code. The console control circuit is responsive to one of the alarm signals to block access of the telephonic handset to the telephone system line during its select digital telephonic communication.

Other objects of the invention will, in part, be obvious and will, in part, appear hereinafter.

The invention, accordingly, comprises the system and apparatus possessing the construction, combination of elements, and arrangements of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 4A-4C combine as labeled thereon to provide an electronic schematic diagram of the circuitry associated with the handset of FIG. 1, additionally showing a keypad programming arrangement utilized therewith;

FIG. 10 is another flow diagrammatic representation of a storage feature of the programming activity carried out by the handset of FIG. 1.

DETAILED DESCRIPTION OF THE INVENTION

Figure 1:
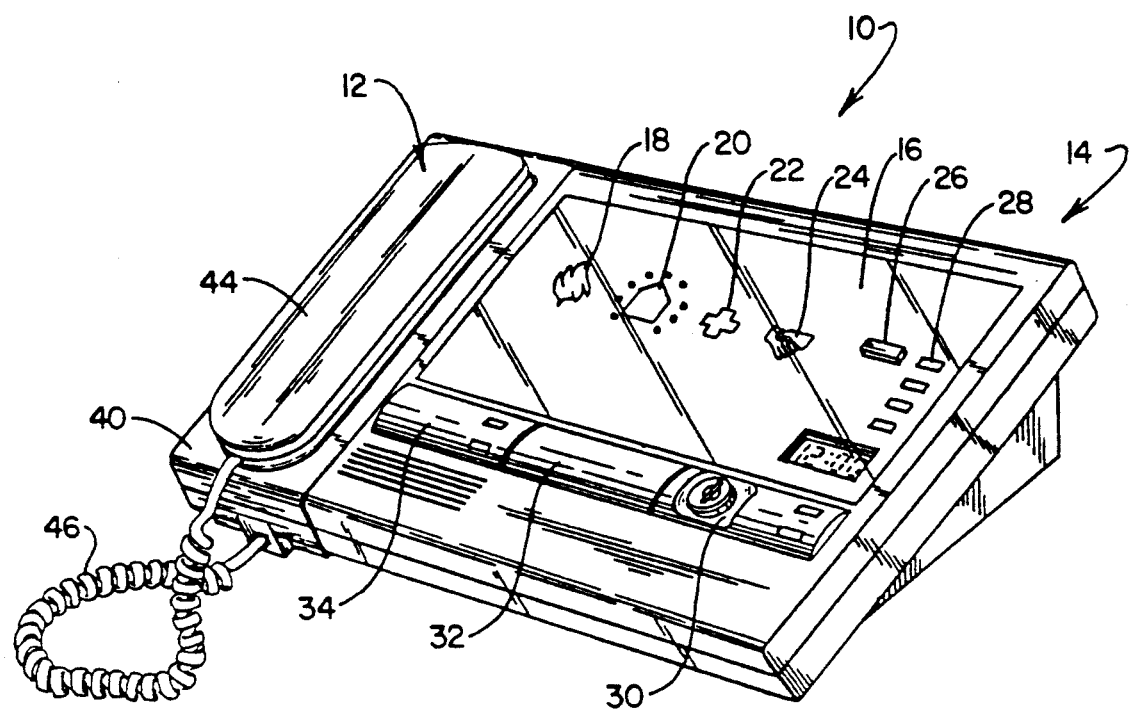
FIG. 1 is a perspective view of a handset and associated console in accordance with the invention.
Figure 1A:
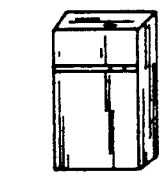
FIG. 1A is a perspective view of a transmitter utilized with the console shown in FIG. 1.

The telecommunication handset of the invention may be employed with a wide variety of personal service systems. One such system with which it is intended to perform provides for home security and emergency monitoring. With such a monitoring service, a central service bureau functions as a monitor of the security systems installed in a substantially large number of homes within a given geographic region. Within each of the homes, intrusion, motion, fire, and medical emergency sensors function to communicate with a central console which, in turn, telephonically carries out an automatic alert function to the monitoring center. That bureau, in turn, notifies appropriate emergency personnel upon the occasion of an alarm condition. The handset of the instant invention while fully capable of "stand alone" performance, also may be incorporated with the home console for such a security system as well as for personal services such as the noted "up and about", "latchkey", travel, retail sales, brokerage and the like functions. Looking to FIG. 1, the combination of the handset of the invention and home security console is represented in general at 10, the handset being revealed in general at 12 and the security console being represented in general at 14. Console 14 is coupled with a conventional household telephone line and includes priority logic for accessing it. The device is seen to include a visually perceptible output panel 16 having a sequence of icons positioned thereon which are illuminated depending upon a function being carried out. For example, a fire icon is shown at 18; an intrusion icon is seen at 20; an emergency icon is shown at 22; and a personal services activity icon which operates in conjunction with handset 12 is shown at 24. The icon 24 is illuminated, for example, by a lower positioned blue light and is activated at such time as the handset 12 is in an "off-hook" state or where a message is waiting from a personal services entity. A test button or switch is shown at 26 extending through the panel 16, while a sequence of state indicators which are selectively illuminated is shown generally at 28. For the most part, alarm signals are transmitted to the console 14 from small monitoring transmitters as shown in FIG. 1A which are actuated by sensor devices to broadcast coded R.F. signals. The coded data of these R.F. signals will include an identification of the facility such that the console 14 uniquely responds only to signals with that code identification. Next, the transmitted code will include a digitally coded representation of the type of alarm signal involved, and this is through a "zone" designation. Operator inputs to the console 14 include a key switch 30 for arming the device; a quiet/reset switch 32, and a home/away switch 34. Not seen is a hold-up alarm switch mounted at the upper rear portion of console 14. A more detailed description of consoles as at 14 is set forth, for example, in U.S. Pat. No. 4,647,914 by Alexander entitled "Security Apparatus and System", issued Mar. 3, 1987 which is incorporated by reference herein.

Figure 2:
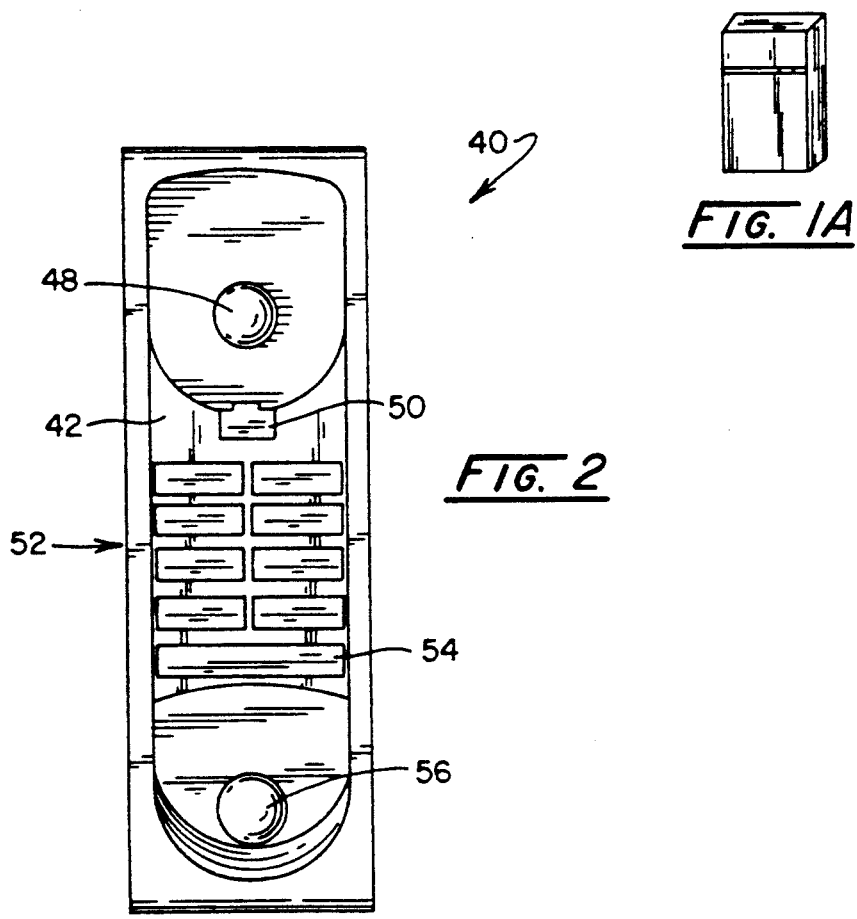
FIG. 2 is a top view of the cradle component of the handset shown in FIG. 1.

The handset assembly 12 is formed of two components, an elongate rectangular cradle 40 having an interiorly disposed cavity 42 (FIG. 2) which functions to receive and support a hand-held microphone and receiver component or unit 44 which is tied to the cradle 40 through electrical cord 46. In the arrangement shown in FIG. 1, the unit 44 provides an on-hook status in conjunction with the cradle 40. FIG. 2 reveals the interior of the cavity 42 of cradle 40, showing a round button form of hook switch 48 which is depressed upon the insertion of unit 44 within cavity 42. The figure further reveals the presence of a receiver clip 50 below which is arranged an array 52 of service request buttons as well as a "911" access switch or button 54. The number of service request buttons (SRB) within the array 52 may be varied to suit the needs of the designer. In general, when the device 12 is programmed, icon carrying labels are placed over a portion of the selected switches of the array 52 for user identification of a given service. Service button numbers "0" through "9" remain visible to the user, the labels covering only a portion of said button. The handset 12 may be used in a stand-along manner, for example, being mounted to a wall or employed in desktop fashion. Not seen on the cradle component 40 but accessible from the rear thereof is a battery compartment as well as an access to a programming port in conjunction with that compartment. An alignment dome 56 is formed within cavity 42 which cooperates with a corresponding hemispherical depression (not shown) formed with unit 44 to aid in its positioning within cradle 40.

Figure 3:
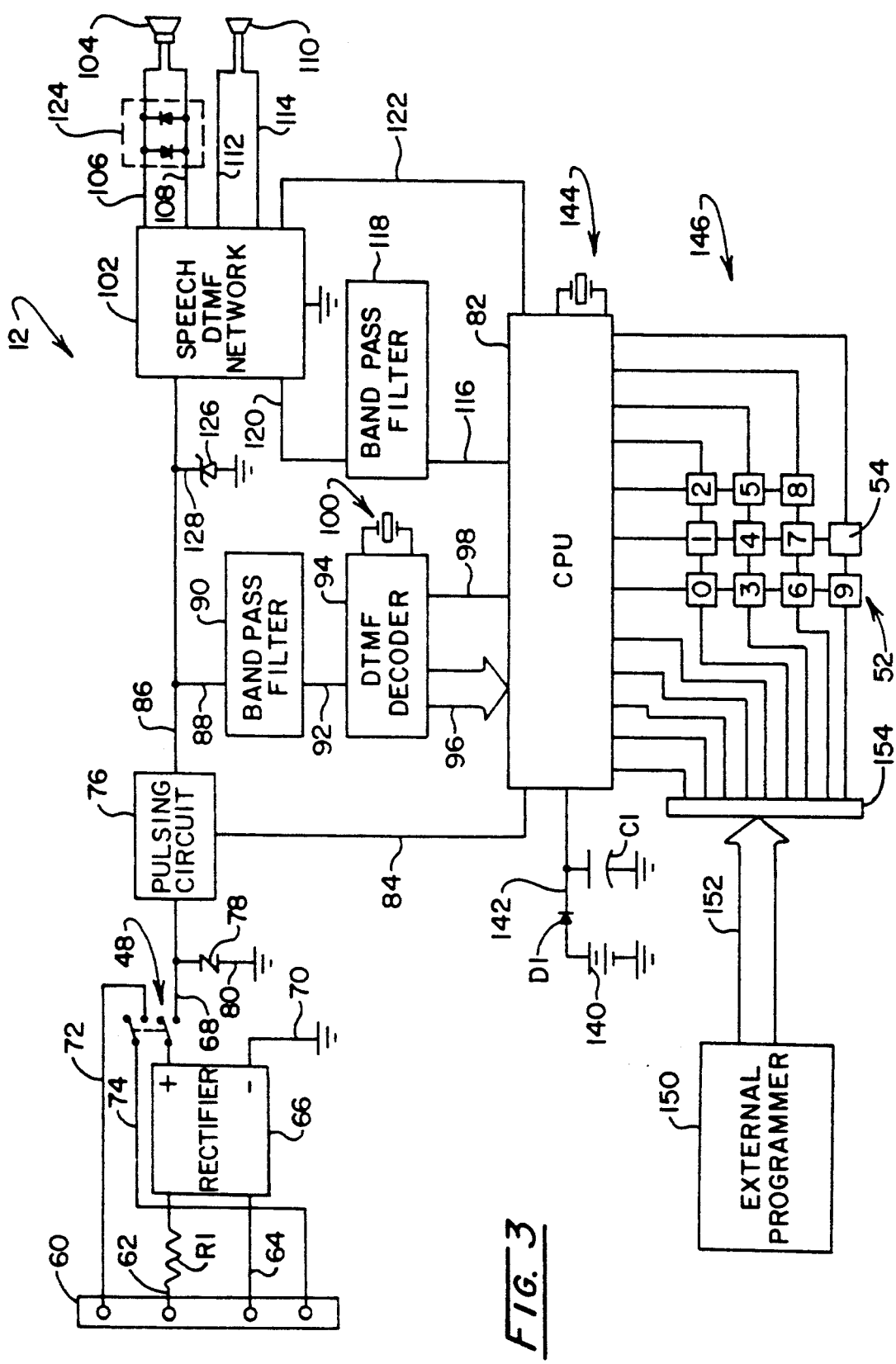
FIG. 3 is a block electronic schematic diagram of the circuit components provided with the handset shown in FIG. 1.

Referring to FIG. 3, a block schematic representation of the circuitry by which the handset 12 carries out its dedicated functions is revealed. The device 12 includes a conventional coupling as represented at 60 for connection to the tip and ring lines of a telephone system. In this regard, these lines are represented at 62 and 64 being directed to a conventional rectifier 66. Rectifier 66 serves the function, for example, of accommodating for the reverse coupling of wires 62 and 64. A fusing resistor R1 is seen within line 62. The output of rectifier 66 is controlled by one throw of the switch 48 at output line 68. Note, additionally, a coupling of the rectifier 66 to ground via line 70. An indication of an off-hook status or state also may be provided by the hook switch 48. For example, under an off-hook condition, the switch 48 is closed to, additionally, provide an energized or activated output at switched lines 72 and 74. These lines function, for example, when the handset 12 is associated with a console as at 14, to effect the illumination of the indicator light 24. This gives the user a visual feedback that a personal service function is under way. Logic within the console 14 also may be employed for providing a message waiting feature wherein the light 24 is illuminated intermittently in response to a telephonic communication from a personal service organization.

Output line 68 is seen coupled to a pulsing circuit represented at block 76. This circuit functions, where called for, to provide pulse dialing communication. Additionally associated with the line 68 is a surge protector 78 coupled within line 80 between line 68 and ground. Protector 78 functions in conventional fashion to protect the equipment against voltage surges occasioned, for example, from lightning strikes and the like. The pulsing circuit is seen to be under the control of a central processing unit (CPU) represented at block 82 via line 84. CPU 82 may be provided, for example, as a type 47C451AN marketed by Toshiba. The device is a four bit CMOS microcontroller having a DTMF (dual tone multi-frequency) generator and large capacity random access memory (RAM) for repertory dialing applications as well as program memory. Performing in conjunction with that memory, the processor 82 functions to operate in programming and service access and interactive modes. In the former programming mode, the device functions to receive and store an applied account code for effecting its transfer to memory as account code data, as well as service request button or switch identification and service bureau telephone communication data. The device 82 responds to access protocol codes emanating telephonically from the service bureau as part of the formation of a telephonic linkage between the user and that entity. In this regard, it may be observed that the output of the pulsing circuit represented at blocks 76 as at line 86 is seen coupled via line 88 to a bandpass filter represented at block 90, the output of which, in turn, at line 92 extends to the input of a DTMF decoder represented at block 94. Decoder 94 may be provided, for example, as a type TC35305P DTMF receiver functioning to detect dual tone multiple frequency signals. These signals are filtered through high and low group filters and encoded into four bit code at its latched output. This output is directed, in turn, as represented by bus arrow 96 to corresponding data inputs of CPU 82. An enabling communication from device 82 to device 94 is represented at line 98. The device 94 performs in conjunction with the 3.58 MHz input of an oscillator stage represented generally at 100. Thus, with the presence of an incoming touch tone signal, the device 94 may provide at bus 96 a number representing digits 0 through 9 and also the letters A through D, representing 16 possibilities.

Line 86 further is seen to extend to a speech DTMF network represented at block 102. Network 102 may be provided, for example, as a type BA8216 marketed by Rohm Co., Ltd. The device 102 functions to send touch tones representing account codes and the like to the service bureau as well as to carry out dialing. The device also performs what is generally referred to as a "subscriber line interface" (SLIC) which establishes directionalities for spoken information going out or being listened to. In this regard, the device is seen coupled to the receiver speaker function 104 via lines 106 and 108, and to the microphone function 110 via lines 112 and 114. One output of CPU 82 is seen coupled via line 116 through a bandpass filter 118 and thence via line 120 to the DTMF input terminal of network 102. Additionally, a mute function can be asserted at network 102 from CPU 82 as represented at line 122. A clamping circuit represent within the phantom block 124 functions to protect the listener from excessive bursts of noise and the device 102 is protected from excessive voltages by a voltage controlling function represented at the Zener diode symbol 126 within line 128 and coupled to ground.

Figure 3A:
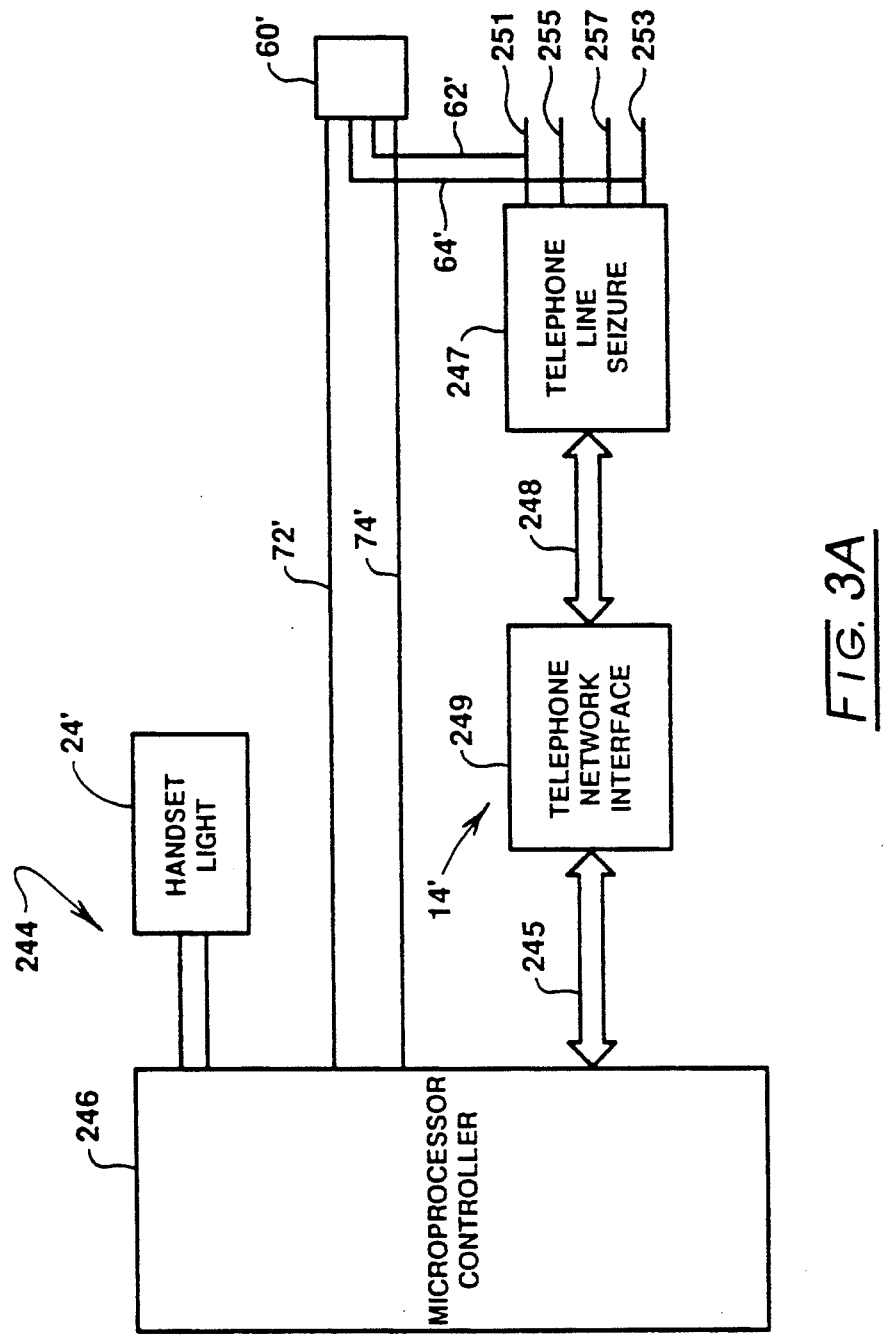
FIG. 3A is a block diagrammatic representation of association of the circuit of FIG. 3 with the circuit functions of the control console shown in FIG. 1.

Returning to CPU 82, the device is seen to normally be powered from line 84 but to include an OR logic associated battery back-up including battery function 140 shown coupled thereto via line 142 incorporating diode D1. A capacitor C1 additionally coupled to line 142 serves to provide momentary power support during battery changing operations. Device 82 also performs in conjunction with the clock input of a 480 KHZ oscillator function represented in general at 144. The SRB button or switch inputs from array 52 as well as switching input 54 to device 82 are shown provided at line array 146. Note in the figure that each of the SRB switches as at array 52 are identified additionally with a numeric designation of 0 through 9. This identification also is provided to the user such that where a service bureau in communication is providing menu-driven automatic voice response system communications (AVRS) the user may depress appropriate digits to answer computer generated requests or questions. Programming of the handset 12 may be provided from a hand-held keypad form of external program or through an interface circuit coupled with a conventional personal computer. This external programming input is represented at block 150 and bus arrow 152 leading to a connector represented at block 154. The connector as at block 154 is that contained within the rearward and accessible compartment of the cradle component 40 of handset 12. This programming necessarily is provided following the sale of a service such that user selected service bureau access protocol data are inserted, account numbers are inserted, as well as service bureau telephone numbers. Accordingly, the programming function may be carried out by field personnel or following the identification of a customer and sale of the service at a distributor or retailer level. Additionally, programming can be carried out (phone and account number) essentially at the production sites, advantage being taken of such network routing services as the "MCI Enhanced Call Router" or "AT&T Call Prompter" and the like. Further, 800 number based national public services such as the National Poison Control Center can be preprogrammed. Referring to FIG. 3A, the interrelationship of lines 62' and 64' representing tip and ring telephone loop lines and lines 72 and 74 providing for communication with console 14 light 24 is revealed. Coupling 60 is represented at 60' in FIG. 3A and may be provided, for example, as a conventional telephone jack. The console is again represented generally at 14 but in primed fashion, and is seen to include a console control circuit 244 which includes a microprocessor controller function 246. Controller 246 communicates with the earlier-described handset light, again represented at 24 but in primed fashion. To effect communication providing, for example, for the excitation of the light 24, earlier-described lines 72 and 74 again are reproduced in the figure and represented, respectively at 72' and 74'. Microprocessor-controller 246 is seen communicating via bi-directional bus arrangement 245 with a telephone interface network represented at block 249. This network 249 is a portion of a communications network which further includes a line seizure network represented at block 247. Network 247 is in communication with telephone interface network 249 as represented at multi-line bus 248. Described in detail in the noted U.S. Pat. No. 4,647,914, seizure network 247 is coupled with the tip and ring telephone lines of a user installation, for example, the telephone line coming into a home as are represented at lines 251 and 253. It may be observed that lines 62 and 64 representing tip and ring connecting lines as described in FIG. 3 again are represented, but in primed fashion, as being coupled, respectively, to lines 251 and 253. However, for line seizure purposes, those lines are switched out of the telephone system loop and line seizure tip and ring lines 255 and 257 are elected for emergency purposes. The latter lines again represent tip and ring connections.

Figure 4B:
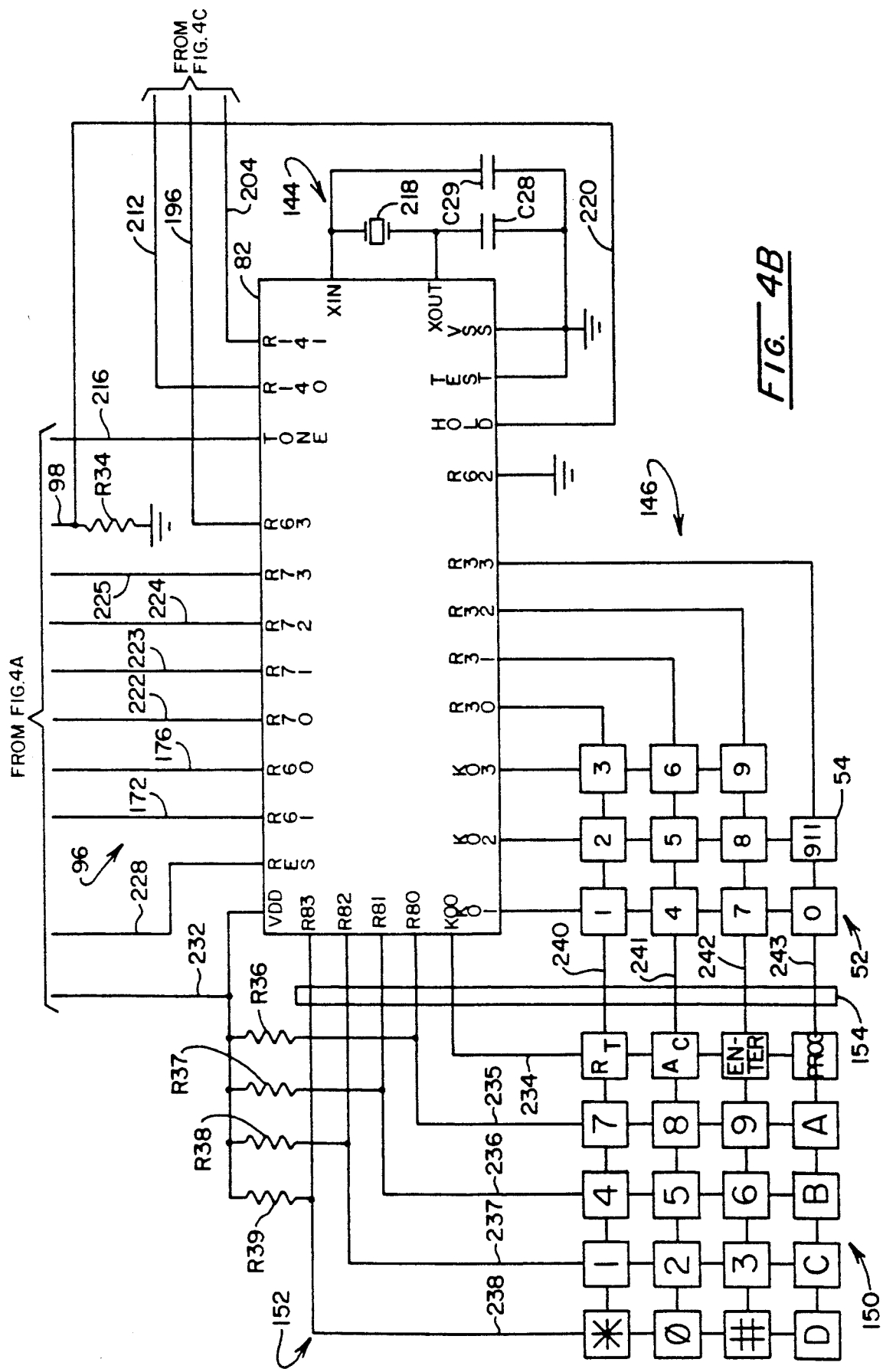
Figure 4C:
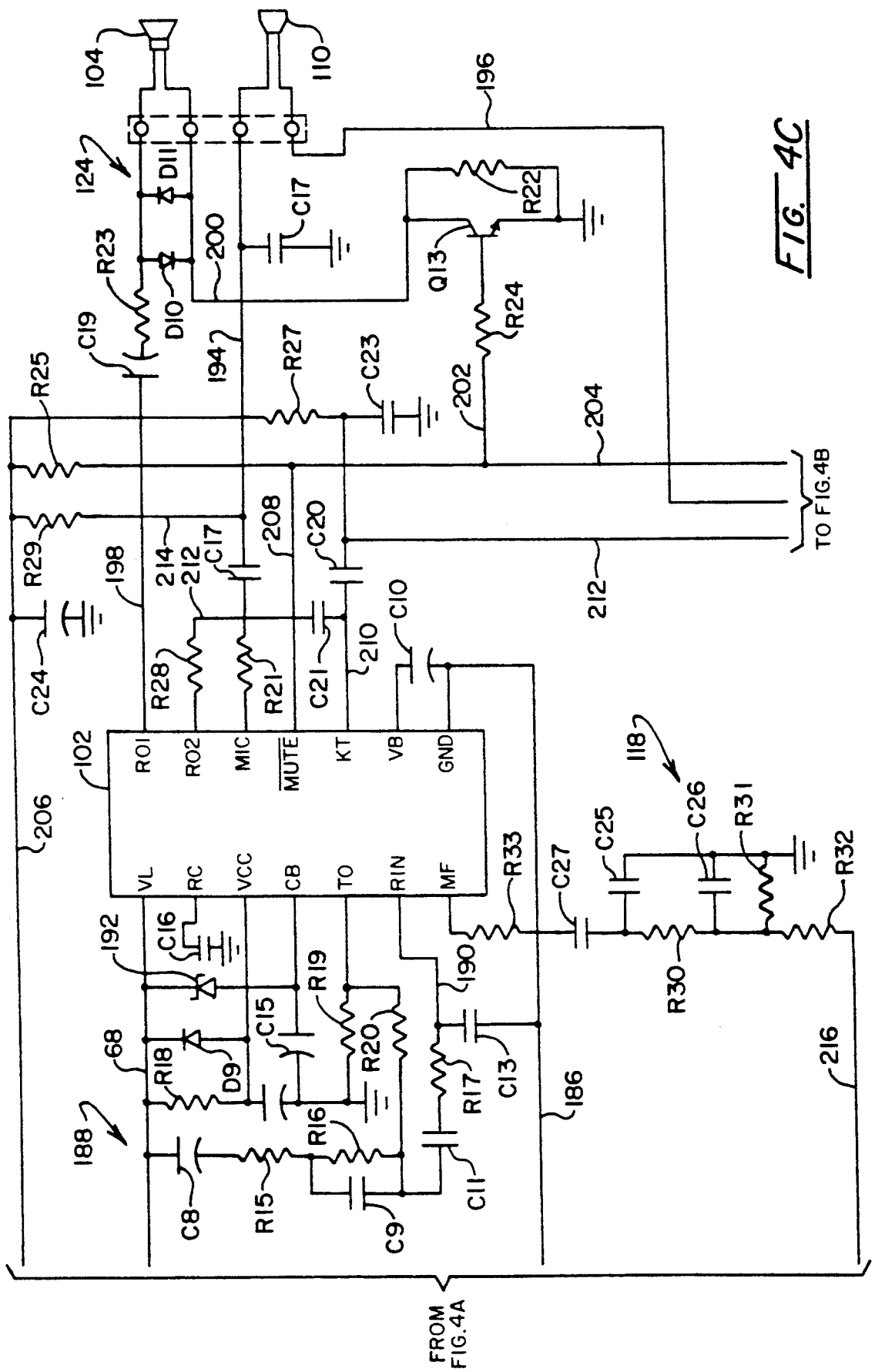

Referring to FIGS. 4A-4C, the circuit of FIG. 3 is revealed at a higher level of detail. These figures should be considered in conjunction with the interrelating labeling thereon. Looking initially to FIG. 4A, coupling 60 again is reproduced in conjunction with lines 62, 64, 72, and 74 leading, as before, to a full wave rectification stage represented generally with the earlier numeration at 66. Rectifier 66 is seen to be formed of four diodes D2-D5 functioning to provide a d.c. output with respect to lines 68 and 160. Note that line 160 is coupled via line 162 to ground. As before, lines 72 and 74 are coupled to one side of the hook switch 48 again reproduced in FIG. 4A and function to provide the earlier-noted activation of the icon 24 of console 14 described in conjunction with FIG. 1.

The d.c. power supply of rectifier 66 is tapped at line 164 thereof via line 166 which is seen to extend through a resistor R2 to a power supply function represented generally at 168 including earlier-described battery 140 as well as blocking diode D1. Line 166 to extends to line 170 which incorporates diode D1 as well as a resistor R3. Earlier-described momentary power support described in conjunction with capacitor C1 in FIG. 3 is now present as combined capacitors C2 and C3. The power supply is, to an extent, regulated by a Zener diode D6 coupled between line 170 and ground.

Power supply at line 170 is seen to extend through resistor R4 to line 172 which, in turn, is coupled to the collector of an NPN transistor Q1. The base of transistor Q1 is coupled via line 174 and timing resistor R5 to line 68, as well as through line 176 and timing capacitor C4 to ground line 160. A resistor R6 also coupled between line 160 and line 176 functions to provide assured turn-off. Thus configured, the transistor Q1 is turned on for an interval determined by the time constant of the timing network comprised of resistor R5 and C4. This on condition draws line 172 to a logic low or ground for the interval of that timing and, looking additionally to FIG. 4B, line 172 is seen to be coupled with the R61 terminal of CPU 82. The logic low signal provides an input to device 82 indicating that an off-hook state is present.

Returning to FIG. 4A, the pulsing circuit represented at block 76 in FIG. 3 is again shown by that general designation. Pulse dialing circuit 76 is a conventional structure being formed of NPN transistor Q2 in combination with PNP transistors Q3 and Q4 configured in combination with resistors R7-R9. A metal oxide varistor (MOV) 175 or the equivalent thereof provides overvoltage or surge protection for the network 76. Network 76 is actuated by pulses submitted from line 176 which, looking additionally to FIG. 4B emanate from terminal R60 of CPU 82.

Adjacent network 76 is a power supply network represented generally at 178 and comprised of NPN transistor Q5 performing in conjunction with Zener diode 180, resistors R10 and R11, and capacitor C5. The constant current output of the network 178 is seen directed to the VDD, PD, and OSCE terminals of decoder 94. Note additionally that the supply is provided via line 182 and steering diode D7 to supply line 170.

The band pass filter described in conjunction with block 90 in FIG. 3 is represented in general by that numeration in FIG. 4A. This filter is seen to be comprised of resistors R13 and R14 performing in conjunction with capacitors C6 and C7. Serving to reject any unwanted harmonic frequencies, the output of the filter at line 184 is directed to the signal in (SIGIN) analog terminal of decoder 94.

The earlier-described voltage controlling function 126 again is represented in FIG. 4A by that same numeration within line 186 extending between lines 68 and 160, and directed to the speech DTMF network 102 at FIG. 4C.

Referring to FIG. 4C, line 68 is seen to continue to the VL terminal of speech DTMF network 102 and line 186, correspondingly, is seen directed to the ground (GND) and VB terminals thereof in conjunction with a filtering capacitor C10. Adjacent to the device 102 is a balancing or hybridizing network represented generally at 188 and comprised of capacitors C8, C9, and resistors R15 and R16. Network 188 serves the conventional function of controlling side tone effects. Speech input to the device 102 is at the RIN port via line 190 incorporating coupling capacitor C11 and resistor R17. A capacitor C13 is coupled between line 190 and line 186. The CB terminal of device 102 is coupled with a voltage stabilizing Zener diode 192 as well as with a corresponding network including capacitors C14, C15 and resistor R18. The T0 output of the device is coupled with that same network through resistor R19 functioning to convey spoken signals into the telephone system.

Microphone input from microphone 110 is provided via line 194 which includes coupling capacitor C17 and input resistor R21. A capacitor C18 is coupled as a filter between line 194 and ground. The opposite coupling with microphone 110 is at line 196 which, looking additionally to FIG. 4B, extends to the R63 terminal of CPU 82 to provide a connection permitting the latter device to mute the microphone function. The corresponding speaker output of the system is provided from the R01 terminal of device 102 at line 198 which is coupled to speaker 104 through capacitor C19 and resistor R23. Earlier described clamping circuit 124 is identified by the same general numeration in FIG. 4C and is seen to be comprised of reverse coupled diode pair D10 and D11. The opposite input to speaker 104 is provided at line 200 which, as in the case of the microphone 110, is under the control of CPU 82. Line 200 is seen to extend to a switching, NPN transistor Q13, the base of which is coupled to line 202 carrying base resistor R24 and, in turn, coupled to line 204. Line 200 from the device 104 is seen to be coupled through resistor R22 to ground. This coupling is selectively shunted by the transistor Q3 which, in turn, is controlled from the R141 port of CPU 82 as seen in FIG. 4B. Thus, as in the case of the microphone 110, the speaker 104 can be selectively muted by device 82. Line 204 also is seen to extend through pull-up resistor R25 to line 206 which, as seen at FIG. 4A, extends through resistor R26 to line 68. Line 204 additionally extends through line 208 to the mute terminal of device 102. Thus, control of the mute function from CPU 82 is completed. The key tone input terminal (KT) of device 102 is seen coupled to CPU 82 via line 210 including coupling capacitor C20 and line 212. Line 212 is seen in FIG. 4B to extend to the R140 beep output terminal of CPU 82. Returning to FIG. 4C, line 210 also is seen coupled to line 206 intermediate resistor R27 and capacitor C23. Additionally, line 210 is seen coupled via line 212 containing capacitor C21 and resistor R28 to the RO2 terminal of device 102. A pull-up resistor R29 is seen coupled within line 214 extending between line 194 and line 206 and a filter capacitor C24 is seen coupled between line 206 and ground.

Looking additionally to FIG. 4B, the DTMF tone output from CPU 82 is submitted from its TONE terminal to line 216 which, as seen in FIG. 4C, extends through a bandpass filter network represented generally at 118 in correspondence with block 118 described in connection with FIG. 3. Network 118 includes capacitors C25 and C26 operating in conjunction with resistors R30-R32. The network functions to reject unwanted harmonic frequencies which may be evolved in the tonal function. Line 216 is seen to continue to a coupling with the MF input terminal of device 102 through coupling capacitor C27 and resistor R33.

Turning to FIG. 4B, the CPU 82 and its associated networking is revealed. The XIN and XOUT ports of the device are seen coupled with the output of a 480 KHz oscillator including crystal 218 and capacitors C28 and C29. That network also is operatively associated with the TEST and VSS ports. The hold request terminal (HOLD) of device 82 is seen coupled via line 220 to line 98 above resistor R34. Line 98, in turn, is directed to the DV and OE terminals of decoder 94 as seen in FIG. 4A. Additionally extending from the R70-R73 I/O ports of CPU 82 are respective data lines 222-225 which, in turn, extend to respective data terminals D1-D3 of decoder 94. It is through these terminals that coded information can be provided, either received from the monitoring or service facility or transmitted thereto in terms of access protocols and the like.

The reset input to CPU 82 is provided at line 228. Looking to FIG. 4A, line 228 is seen to extend to a reset network represented generally at 230 and comprised of capacitor C30, resistor R35, and diode D14. Thus configured, the network 230 provides a start-up resetting pulse, the capacitor C30 being dischargeable through diode D14 which is coupled with line 170 from line 232. Returning to FIG. 4B, it may be observed that line 232 also is directed to the VDD terminal of CPU 82. Key inputs from the key array 52 again are represented by the general numeration 146. Note in this regard that the 10 keys are polled from conventional key logic associated with ports R30–R33 and K01–K03 of CPU 82. Note, additionally, the external programmer key array 150 which is utilized by installing personnel to establish appropriate protocols for the services required by the user. As noted above, in addition to the numerical identification for the keys within array 52, the servicing personnel will place adhesively attached labels with appropriate icons printed thereon for the services supplied by the handset. Note that the key array 150 has 20 keys and is polled from line array 152 including lines 234–238 which are coupled, in turn, to terminals K00 and R80–R83 of CPU 82. The opposite inputs to the matrix 150 are provided at lines 240–243 which, in effect, are directed to array 146 and terminals R30–R33. Pull-up resistors R36–R39 are seen coupled to respective leads 235–238 of array 152. These resistors are, in turn, coupled to line 232.

The software program under which CPU 82 forms is revealed in conjunction with FIGS. 5–10 in the discourse to follow. Looking to FIG. 5, the main program is identified at node 250 and is seen leading to a first instruction in the program at block 252 providing for initialization procedures including the clearing of random access memory (RAM) and initialization of the port functions. The program then continues as represented at line 254 and block 256 to determine whether or not the hook switch is "on", representing an on-hook condition or "off" representing an off-hook condition. In the presence of an on-hook condition, then as represented at line 258 and block 260, a 20 millisecond time-out is carried out for the purpose of debouncing the hook switch. Where that interval has not been completed, then as represented at lines 262 and 264, the program loops to line 254 and block 256. In the event the time-out has been completed, then as represented at line 266 and block 268 an MCU halt command is carried out which is a signal providing for a power down of the electronics of the system. In this regard, the oscillator is stopped and internal operations are terminated to save battery power. This condition continues until, as represented at block 270 a K00-03 trigger signal is received which, in effect, is an off-hook input waking up the system from its power down or halt mode. Where no such signal is received, then as represented at line 272, a loop condition obtains wherein the system dwells in a power-down or halt mode. Where such wake-up signal is received from keyboard, however, then as represented at line 264, the program returns to line 254 and to an evaluation of the hook switch condition at block 256. Where an off-hook condition is present, as represented at line 274 and block 276, a determination is made as to whether any of the 11 button switches from array 52 or switch 54 have been pressed or actuated. In the event they have not, then as represented at lines 278, 280, and 282, the program loops to return to line 254 and the hook switch evaluation block 256. Where one of the 11 keys has been pressed, then as represented at line 284 and block 286, a determination is made as to whether the "PDRG" program key of an attached programmer 150 has been pressed or computer equivalent signal has been received. In the event that it has, then as represented at line 288, the program enters a program mode and diverts to a routine identified as "PGM" as indicated at node 290 and described in connection with FIG. 8. In the event of a negative determination at block 286, then as represented at line 292 and block 294, a determination is made as to whether a service request button of the array 52 thereof or button 54 has been actuated. In the event that is has not, then as represented at line 296, line 280, and line 282, the program loops to line 254 and the hook switch evaluation made at block 256. Where an affirmative determination is made at block 294, then as represented at line 298 and block 300, a determination is made as to whether a telephone number has been programmed in connection with the SRB key pushed of the array 52. If that is the case and no such number is present in memory, then as represented at lines 280 and 282, the program loops to line 254 and an evaluation of the hook switch state as represented at block 256. Where the memory does hold such data, then, as represented by line 302 and node 304, the program enters an access mode including a dialing service request button routine (DSRB).

Figure 5:
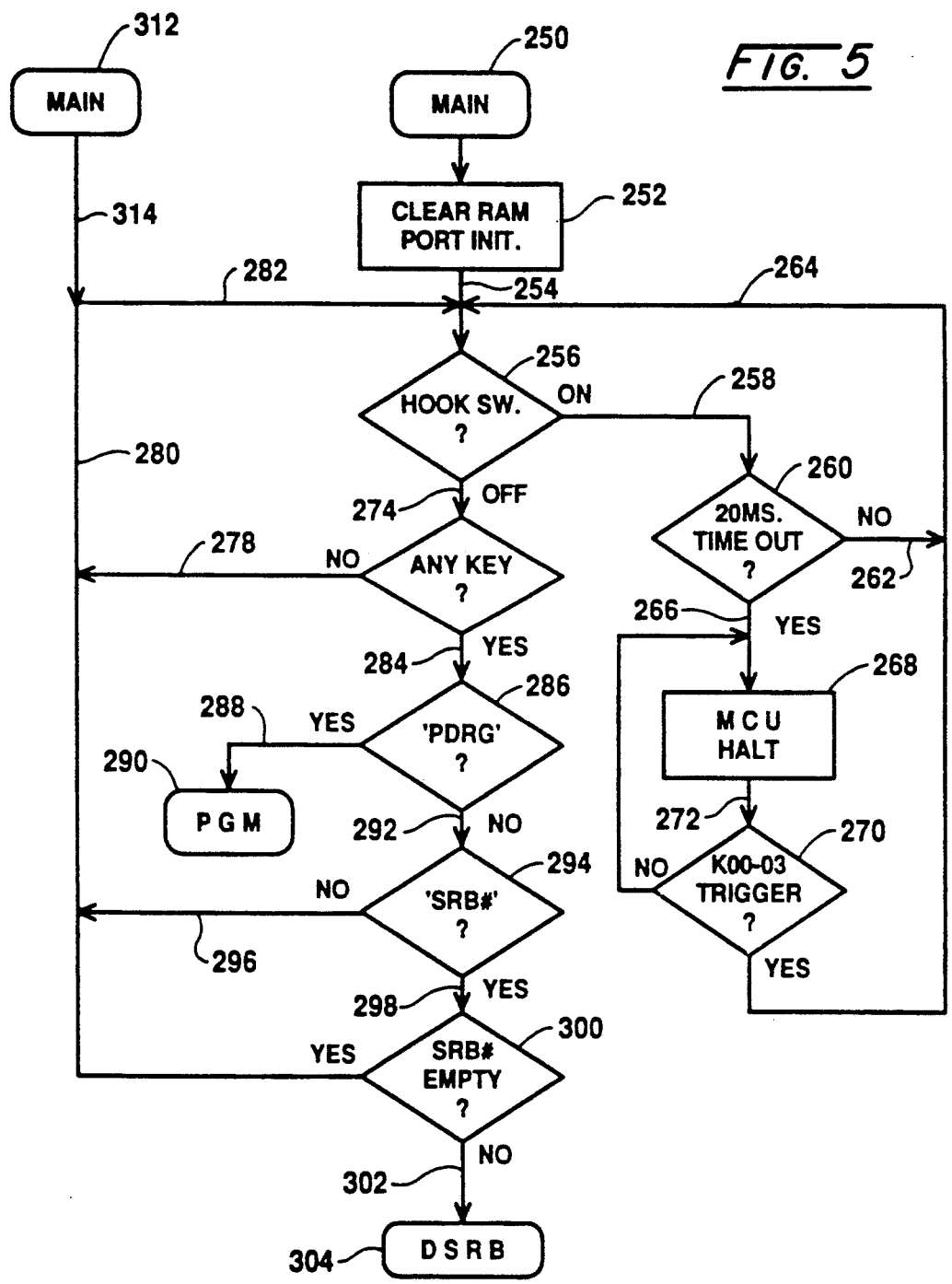
FIG. 5 is a flow diagram describing a main software program of the handset of FIG. 1.
Figure 6:
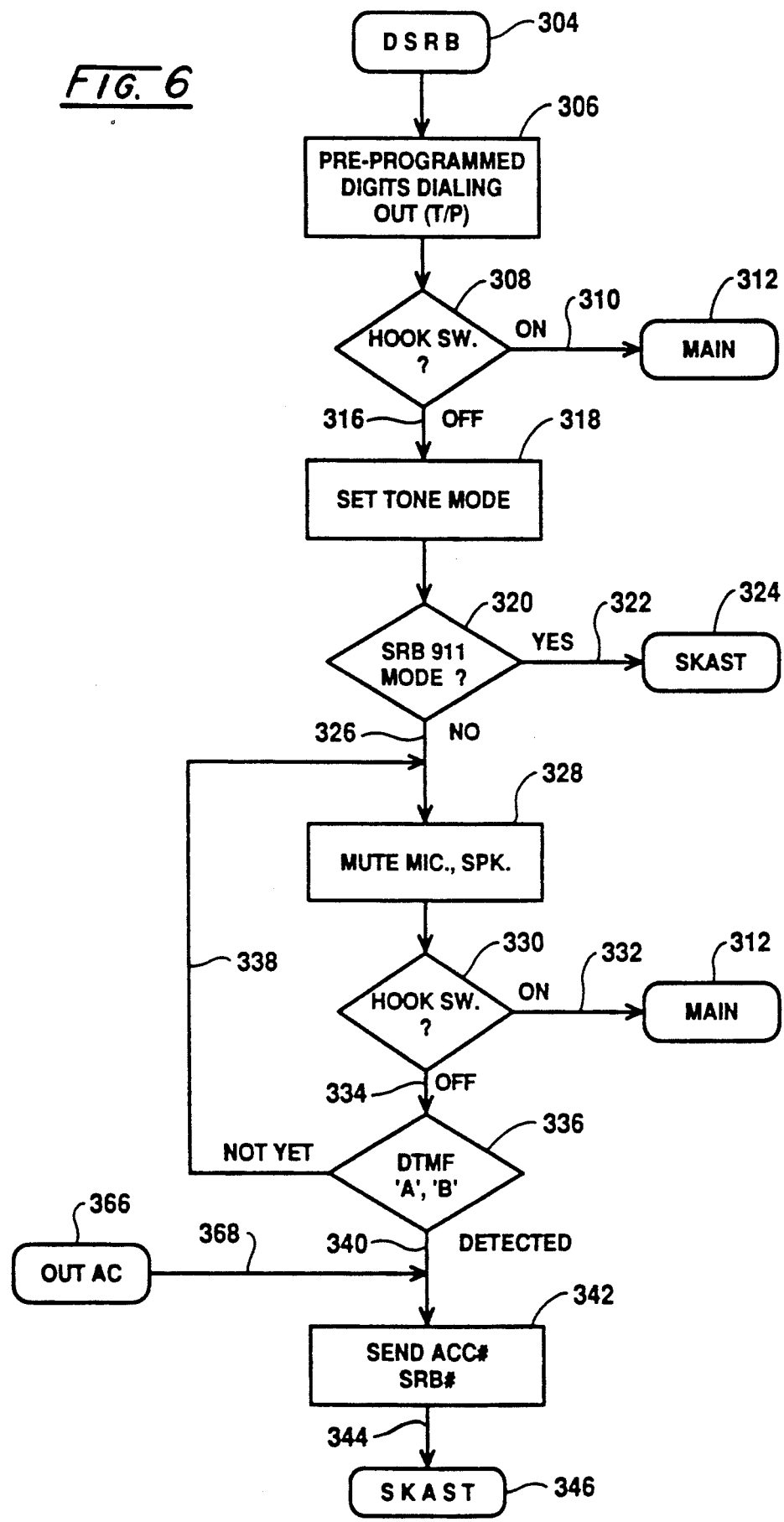
FIG. 6 is a flow diagrammatic drawing of an access mode operation of the handset of FIG. 1.

Referring to FIG. 6, the dialing service request button (DSRB) program is represented as comencing with the earlier-noted node 304 which leads to the instructions at block 306 providing for the dialing out of the pre-programmed number. Such dialing will either be in DTMF tone or a pulse form. The program then turns to the inquiry at block 308, again determining whether or not the hook switch is on-hook. In the event an on hook condition exists, then as represented at line 310 and node 312, the program returns to the main program as seen by a node with the same numeration at 312 in FIG. 5. From this node, line 314 is seen to extend to line 282 and the inquiry following from line 254 at line 256 determining hook switch status. Where an off-hook condition is at hand, then as represented at line 316 and block 318, the dial tone mode is set for the purpose of carrying out communication with the remote host computer. Only dial tone transmission is utilized for this purpose. The program then continues to the inquiry at block 320 where a determination is made as to whether the "911" service request button 54 has been actuated. In the event that it has, then as represented at line 322 and node 324, the program reverts to a routine identified as "SKAST" described in conjunction with FIG. 7.

Where the inquiry at block 320 is in the negative, then as represented at line 326 and block 328, microphone 110 and speaker 104 (FIG. 4C) are muted. The microphone 104 is muted such that there is no interference with the transmission either from the handset or from the host facility. For example, the communication protocol will involve the transmission by the host of an initial acknowledgment, for example the letters "A,B". Once that transmission from the host has been received, an account code and service request number or service code can be transmitted from the handset. Accordingly, upon the muting of these functions, as represented at block 330, a determination again is made as to whether the hook switch is on or off. In the event of an on-hook condition, then as represented at line 332 and node 312, the routine returns to the main program and node 312 as seen in FIG. 5. That return is seen directed to lines 282 and 254 again looking to hook switch status review as represented at block 256. Where an off hook condition is present, then as represented at line 334 and block 336, a determination is made as to whether the DTMF tones "A" and "B" have been received. Where they have not been received, then as represented at loop line 338, the program dwells until they are received. Accordingly, upon receipt of those protocol introductory signals, as represented at line 340 and block 342, the account number and the service request button identification or number is transmitted to the host. The program then continues as represented at line 344 and node 346 (SKAST) which refers to a program concerned with the transmission or dialing out of given numbers associated either with 911 key 54 or one of the numerical key values in button array 52.

Figure 7:
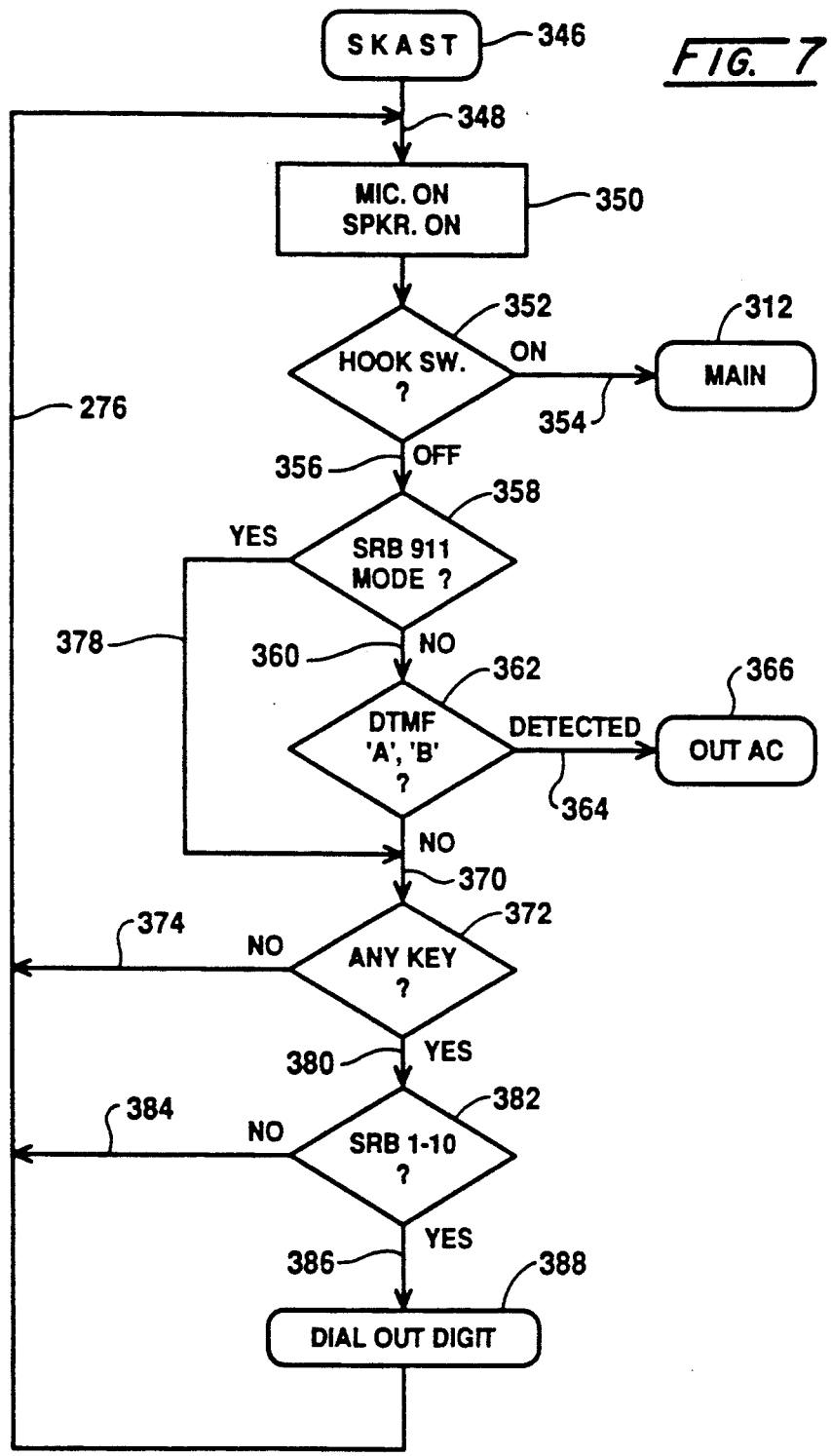
FIG. 7 is a flow diagrammatic illustration of software for carrying out dialed communication with a personal service facility.

Referring to FIG. 7, the SKAST program is depicted as being entered in connection with earlier-described node 346 and line 348. As represented at block 350, the microphone 110 and speaker 104 are enabled and the routine progresses to a determination of hook switch status as represented at block 352. In the event an on hook condition has occurred, then as represented at line 354 and node 312, the program returns as represented in FIG. 5 by node 312, lines 314, 282, and 254, providing inquiry as to hook switch status at block 256. Where the inquiry at block 352 indicates that an off-hook status is at hand, then as represented at block 358, a determination is made as to whether a 911 mode is present. In the event that it is not, then as represented at line 360 and block 362, a determination again is made as to whether a "A", "B" protocol signal has been received from the host which, in effect, requests a retransmission of account number. If such a transmission has been received from the host, then as represented at line 364 and node 366, the program is directed to output the account code again. Node 366 will be seen to appear again in FIG. 6 in conjunction with lines 368 and 340 leading to the instructions at block 342 providing for the sending out of an account number.

Where the inquiry at block 362 results in a negative response, then as represented at line 370 and block 372 an inquiry is made as to whether any key of the array 52 or key 54 has been actuated. Such an actuation, for example, may be in conjunction with an automatic voice response system (AVRS) as discussed hereinabove and falls within an interactive mode. Where no key has been depressed, then as represented at lines 374 and 376, the program loops to line 348 and again reiterates the above instructions. Where the inquiry at block 358 is in the affirmative and a 911 mode is at hand, then as represented at line 378, the inquiry at block 362 is bypassed to the inquiry as above discussed at block 372. Where any key has been actuated, then as represented at line 380 and block 382, an inquiry is made as to whether one of the service request buttons designated as numbers 1 through 10 within array 52 has been actuated. In the event that it has not, then as represented at lines 384, 376 and 348, the program loops to its commencement. However, where such a button has been actuated, then as represented at line 386 and activity 388 the number signal for the button depressed is transmitted and, as represented by line 376, the program loops to line 348 and reiterates the above.

Figure 8:
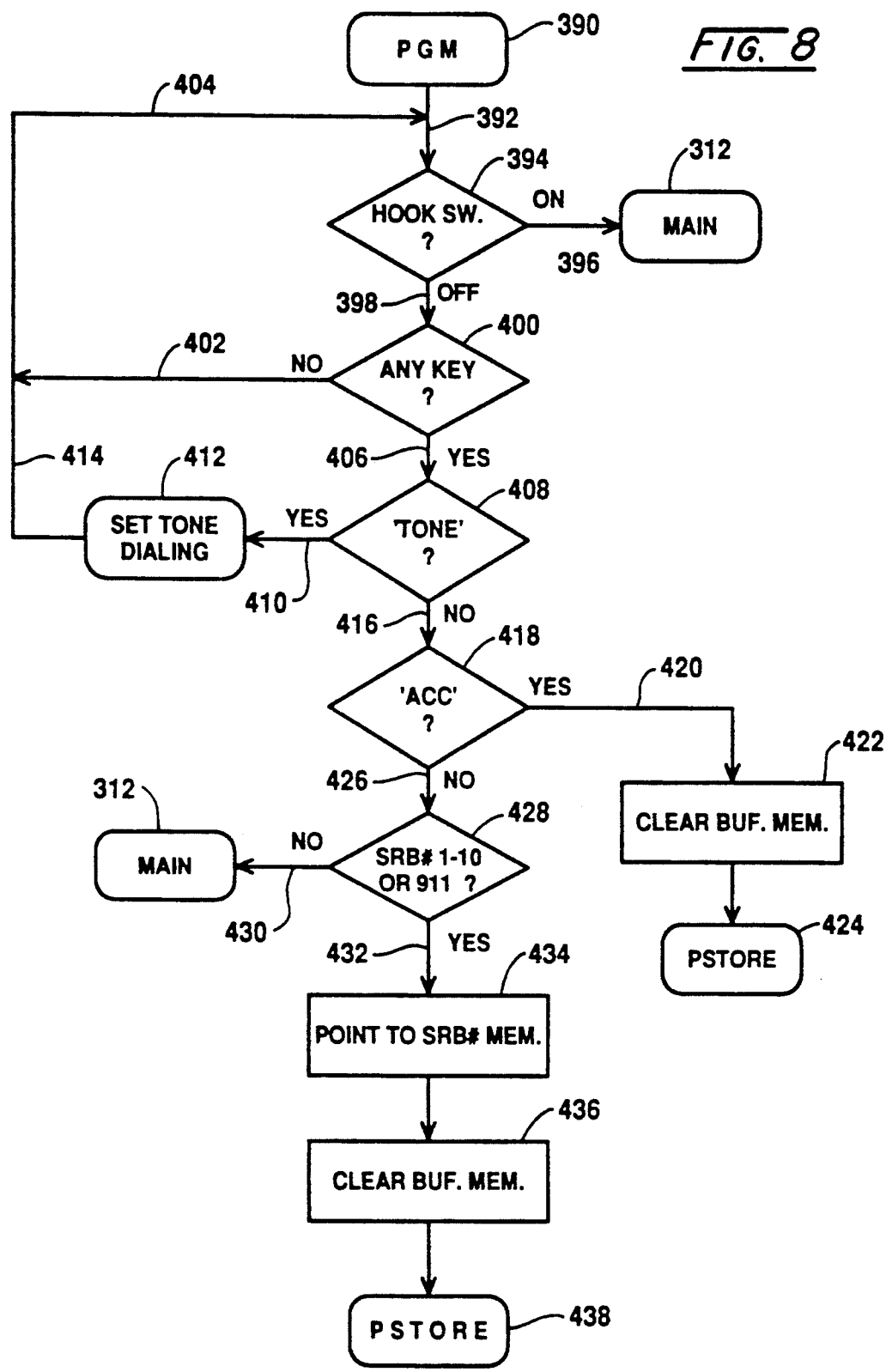
FIG. 8 is a flow diagrammatic illustration of a general programming feature of the handset of FIG. 1.

Referring to FIG. 8, a general program for interaction with service personnel in programming the handset, for example from the portable keypad 150, is illustrated in flow diagrammatic fashion. In the figure, this programming mode is seen entered at node 390 and line 392 looking to the inquiry at block 394 wherein the status of the hook switch is evaluated. In the event that an on hook condition is present, then as represented at line 396 and node 312, the program returns to the corresponding node 312 shown in FIG. 5 inasmuch as programming will require an off hook switch condition. Where an off hook switch condition is present, then as represented at line 398 and block 400 a determination is made as to whether the programmer has depressed any one of the keys of the programming keypad. In the event he or she has not, then as represented at lines 402, 404, and 392, the program loops awaiting the actuation of a programming key. Where such key has been actuated, then as represented by line 406 and block 408, an inquiry is made as to whether a tone form of dialing function switch has been depressed at keypad 150. This switch is labeled "P/T" and when actuated, provides for tone-dialing. The program otherwise defaults to pulse dialing. Where tone dialing is elected, then, as represented at line 410 and instruction 412, a tone dialing instruction is set and the program continues as represented at line 414 and line 404 to loop to the commencement of programming. Where the tone button has not been pushed, then as represented at line 416 and block 418, a determination is made as to whether the account (A/C) button of the program keypad 150 has been actuated. In the event that it has, then as represented at line 420 and block 422, the buffer memory is cleared and, as represented by node 424, the program enters a "PSTORE" routine described in connection with FIG. 10. Where the inquiry at block 418 indicates that the account number keypad button has not been depressed, then as represented by line 426 and block 428 a determination is made as to whether a number key in the array 52 or the 911 button 54 has been depressed for purposes of program entry. In the event of a negative determination at block 428, then as represented at line 430 and node 312, the program returns to the main program, re-entering it represented at lines 314, 282, and 254. Where an affirmative determination is made in connection block 428, then as represented at line 432 and block 434, the program points to the service request button memory and, as represented at block 436 buffer memory is cleared. The program then proceeds as represented by the "PSTORE" node 438.

Figure 9:
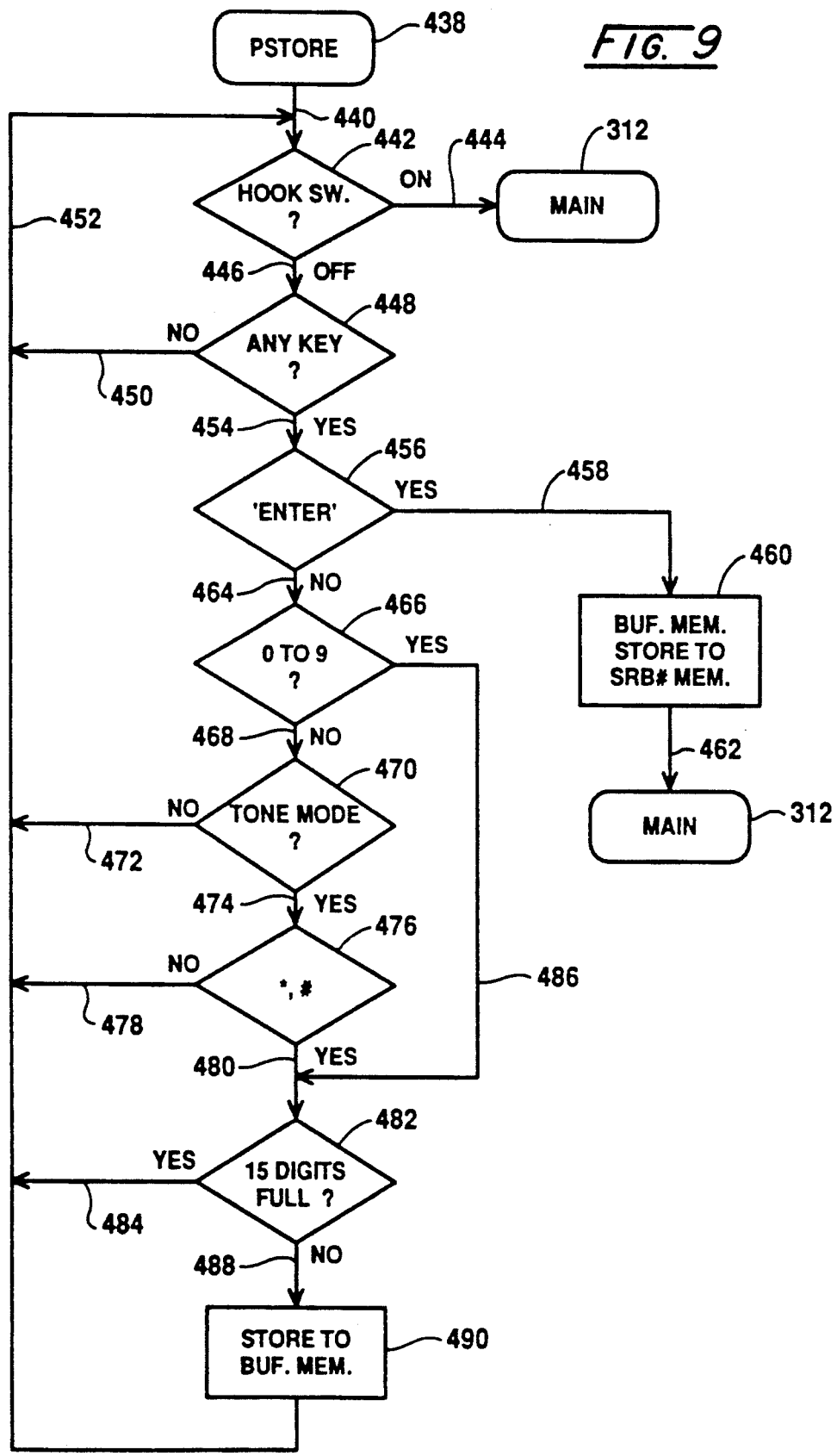
FIG. 9 is a flow diagrammatic illustration of a programming feature associated with the handset of FIG. 1.

Looking to FIG. 9, the PSTORE node 438 again is reproduced. This routine looks to the programming of the telephone number associated with a given or elected service button number and is seen to extend via line 440 to the inquiry at block 442 determining the hook switch status. Where an on-hook status is present, then as represented at line 444 and node 312, the program returns to the main program as shown in FIG. 5 in conjunction with lines 314, 282, and 254. Where an off-hook status is present, then as represented line 446 and block 448, a determination is made as to whether any key has been actuated. Where that is not the case, then as represented by lines 450 and 452 the program dwells or loops to line 440 until a key depression is at hand. Where an affirmative determination is made at block 448, then as represented at line 454 and block 456, a determination is made as to whether the enter button of the keypad has been depressed. In the event that it has, then as represented at line 458 and block 460 the key valuation is stored. The program then proceeds as represented at line 462 and node 312 to return to the main program as represented in FIG. 5 at lines 314, 282, and 254.

Where the keypad enter button has not been depressed by the programmer, then as represented by line 464 and block 466 a determination is made as to whether numbers 0 to 9 of the keypad have been actuated. In the event they have not, as represented at line 468 and block 470, a check is made as to whether the tone mode is at hand. In the event that it is not, then as represented at lines 472, 452, and 440, the program loops or dwells until such tone mode is established. The program then continues as represented at line 474 and block 476 to a determination as to whether an asterisk or pound sign key has been inserted by a programmer. These symbols are used, for example, for turning off a call waiting feature by dialing, for example, *-7-0. A tone mode is required for programming such functions. In the event that the asterisk or pound sign buttons have not been actuated, then as represented at lines 478, 452 and 440, the program loops. In the event of an affirmative determination at block 476, then as represented at line 480 and block 482, a determination is made as to whether the 15 digit limit for telephone number memory has been met. In the event that it has and memory is full, then as represented at lines 484, 452, and 440, the program loops. Returning to block 466, in the event a 0 to 9 button has been pushed, then as represented at lines 486 and 480, the program loops to the inquiry at block 482. Where adequate memory remains, then as represented at line 488 and block 490, the number information is stored in buffer memory. The program then loops as represented by lines 452 and 440.

As described in conjunction with block 418 in FIG. 8, where the count function button of the keypad or programming computer has been activated, the program proceeds to the PSTORE node 424. Looking to FIG. 10, this same node is reproduced at the introduction of the account number programming routine. As represented at line 492 and block 494, an initial determination is made as to the hook switch status. Where an on-hook status is present, then as represented at line 496 and node 312, the program returns to the main program shown in FIG. 5 at node 312, lines 314, 282, and 254. Where an off-hook switch condition is at hand, then as represented at line 498 and block 500, a determination is made as to whether a key has been actuated. Where that is not the case, then as represented at lines 502, 504, and 492, the program loops or dwells pending the actuation of the key. Where a key has been depressed as determined at block 500, then as represented at line 506 and block 508, a determination is made as to whether the "enter" function key of the keypad array 150 or corresponding computer has been actuated. Where that is the case, then as represented at line 510 and block 512 a previously entered keystroke is stored in account memory and, as represented at line 514 and node 312, the program returns to the main program represented in FIG. 5 at lines 314, 282, and 254. Where the enter button of the keypad 150 or computer has not been actuated, then as represented at lines 516 and 518, a determination is made as to whether the numbers 0 through 9 have been actuated. In the event they have not, then as represented at line 520 and block 522, a determination is made as to whether the letters keys representing A through D have been depressed. In this regard, the DTMF tones will include numbers 1 through 10, the asterisk and pound signs as well as the letters A through D. In the event of a negative determination at block 522, the program loops as represented at line 524, 504, and 492. In the presence of an affirmative response to the inquiry at block 522, then as represented at line 526 and block 528, a determination is made as to whether six digits of the account code have developed. The limit for the account code is six digits. Where six digits have been developed, then as represented at lines 530, 504, and 492, the program loops. Returning to block 518, where a number 0 through 9 has been actuated at the keypad, then as represented at line 532, the program skips to line 526 to carry out the determination made in conjunction with block 528. Where six digits have not been placed in the account code, then as represented at line 534 and block 536, the digit at hand is stored in buffer memory and the program loops as represented by lines 504 and 492.

With the above programming routine in mind, upon the installation of the handset, service personnel, for example utilizing the keypad array 150 for programming purposes will carry out the following steps:

1. The battery compartment at the rear or bottom of the cradle component 40 is opened.
2. The protective shield is removed which is located between the battery and its electrical contacts.
3. The modular cable from the keypad array 150 having a length of about 11 inches is either coupled to a line coupled control console 14 or to an active telephone line or a telephone line simulator.
4. The above cable is coupled to the handset 40 and extend programming keypad 150.
5. The receiver component 44 is lifted off the handset 40 cradle to provide an off hook configuration.
6. The PROG button is pressed on the programming keypad array 150 to initiate a program active mode and an acknowledgment tone will be heard by the programmer through the speaker 104;
7. The account (A/C) key then is depressed on the programming keypad array 150 and the account number, which may be up to six digits long and includes numbers 0 through 9 and/or the letters A through D is then typed on the keypad and the "enter" keypad key is pressed.

As noted above, the handset may be programmed for pulse dialing or tone dialing utilizing phone numbers of up to 15 digits in length. Any pulse dialed numbers may include the digits 0 through 9, while valid tone dial numbers may include those digits as well as an "asterisk", and the "pound" sign.

8. If programming the handset for tone dialing, the tone function key, P/T, is pressed on the programming keypad. In this regard, pulse dialing is a default option.
9. The memory location for a service request button is entered by typing its corresponding number on the programming keypad array 150, whereupon the enter button on the keypad is pressed. Thus, a 1 is pressed for SRB number 1 and so forth through 0 and an asterisk is typed for the 911 key 54;
10. The phone number assigned for the SRB is typed using the key array 150 following which the enter button is pressed.
11. The above steps are repeated for all desired SRB buttons.
12. Once all of the SRB keys have been programmed, the receiver 44 is placed back of the cradle 40 to terminate the programming process.
13. The ribbon cable is removed from the handset and from the external programming keypad.

14. The battery compartment cover is reattached.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. A telephonic handset for telephonic communication through a telephone system line with service facilities having predetermined telephonic access numbers, account code data and access protocol codes, comprising:
   a housing assembly including a hand held component and a hook switch, user actuable to have on-hook and off-hook states;
   a microphone and a speaker mounted with said hand held component of said housing assembly for interactive sound communication with a user;
   a plurality of discrete service request actuators mounted upon said housing assembly and each associated with a select one of said service facilities and manually actuable to effect derivation of a corresponding service code in an access mode and to effect derivation of a number signal in an interactive mode;
   a speech and signaling network coupled with said microphone, said speaker and said telephone system line and having a DTMF input and mute function input;
   a dual tone multi-frequency (DTMF) decoder network coupled with said telephone system line and having a digital output;
   memory means for receiving and retaining account codes and service facility telephone numbers; and
   control means coupled with said memory means, said service request actuators, said speech and signaling network, said DTMF input, said mute function input and said DTMF decoder network, responsive to a program mode input for entering a programming mode, responsive in said programming mode to an applied select service code, an applied predetermined telephonic access number, and an applied account code corresponding with said account code data for effecting their transfer to said memory means, responsive in the presence of said off-hook state to a first received service request switch service code for entering said access mode and, during said access mode, accessing said memory means for a corresponding said account code and corresponding said predetermined telephonic access number for effecting the calling and telephonic communication with a select one of said service facilities at said predetermined telephone access number, and subsequently responsive to the receipt of one of said access protocol codes from said select one of said service facilities as a said digital output from said DTMF decoder network for effecting the transmission of said account code, said control means being responsive to the transmission of said account code to enter said interactive mode and is responsive in said interactive mode to a said number signal to effect the transmission thereof to said select one of said service facilities.

2. The telephonic handset of claim 1 in which said control means is responsive in said access mode subsequent to the calling of said select one of said service facilitie, to provide a mute signal at said speech and signaling network to effect muting of said microphone.

3. The telephonic handset of claim 1 in which said control means is responsive, in said access mode, subsequent to the calling of said select one of said service facilities, to provide a mute signal at said speech and signaling network to effect the muting of said microphone and said speaker.

4. The telephonic handset of claim 1 including:
   a pulsing circuit coupled with said telephone system line and actuable to carry out pulse-dialing thereon; and
   said control means is responsive in said access mode for accessing said memory means for said predetermined telephone access number, for actuating said pulsing circuit in correspondence therewith to effect the calling of said select one of said service facilities, and subsequent to the actuation of said pulsing circuit, actuating said speech and signaling network DTMF input to effect transmission of said account code.

5. The telephonic handset of claim 4 in which said control means is responsive in said access mode subsequent to the calling of said select one of said service facilities, to provide a mute signal at said speech and signaling network to effect muting of said microphone.

6. The telephonic handset of claim 1 including:
   a standby battery power supply connected in OR logic relationship with said telephone system line and with said control means; and
   said control means includes oscillator means for providing logic drive and is responsive to said on-hook state to curtail said logic drive, so as to enhance the lifespan of said standby battery power supply.

7. The telephonic handset of claim 1, including:
   portable programmer apparatus having an output removably connectable with said control means and having keyed means manually actuable for deriving said program mode input and said applied select service code, said applied predetermined telephonic access number and said applied account code.

8. The telephonic handset of claim 7 in which said control means is responsive to said program mode input to apply a tone deriving signal to said DTMF input to generate a programming acknowledgment tone at said speaker.

9. The telephonic handset of claim 1 in which:
   said control means is responsive in said access mode, subsequent to the calling of said select one of said service facilities, to provide a mute signal at said speech and signaling network to effect muting of said microphone;
   said control means includes a standby battery power supply connected in OR logic relationship with said telephone system line and with said control means; and
   said control means includes oscillator means for providing logic drive and is responsive to said on-hook state to curtail said logic drive to effece enhancement of the lifespan of said standby battery power supply.

10. The telephonic handset of claim 1 including:
    a pulsing circuit coupled with said telephone system line and actuable to carry out pulse-dialing thereon;
    said control means is responsive in said access mode for accessing said memory means for said predetermined telephone access number, for actuating said pulsing circuit in correspondence therewith to effect the calling of said select one of said service facilities, and subsequent to the actuation of said pulsing circuit actuation, actuating said speech and signaling network DTMF input to effect transmission of said account code;

said control means includes a standby battery power supply connected in OR logic relationship with said telephone system line and with said control means; and said control means includes oscillator means for providing logic drive and is responsive to said on-hook state to curtail said logic drive, so as to enhance the lifespan of said standby battery power supply.

11. The telephonic handset of claim 1 in which:

said control means is responsive in said access mode, subsequent to the calling of said select one of said service facilities, to provide a mute signal at said speech and signaling network to effect muting of said microphone;

including a pulsing circuit coupled with said telephone system line and actuable to carry out pulse-dialing thereof;

said control means is responsive in said access mode for accessing said memory means for said predetermined telephone access number, for actuating said pulsing circuit in correspondence therewith to effect the calling of said select one of said service facilities, and subsequent to the actuation of said pulsing circuit, actuating said speech and signaling network DTMF input to effect transmission of said account code;

said control means including a standby battery power supply connected in OR logic relationship with said telephone system line and with said control means; and said control means includes oscillator means for providing logic drive and is responsive to said on-hook state to curtail said logic drive, so as to enhance the lifespan of said standby battery power supply.

12. A system for a user facility having secure and unsecure conditions which are monitored by detector devices deriving alarm signals in the presence of a said unsecure condition for transmission through a telephone system line to a security monitoring service having an alarm response capability, and said system further providing telephonic interactive communication through said telephone system line with a personal service facility having a telephonic access number, account code data associated with said user facility and an access protocol code, the system comprising:

a console positioned within said user facility for receiving said alarm signals, the console having a console control circuit including a communication network connected with said telephone system line for select digital telephonic communication with said security monitoring service in response to one of said alarm signals and having a display and user control input panel;

a telephonic handset having a housing assembly connectable for support by said console and including a hand-held component and a hook switch actuable to have on-hook and off-hook states;

a microphone and speaker mounted with said hand-held component of said housing assembly for interactive communication with a user;

a plurality of discrete service request switches mounted upon said housing assembly and each associated with a said personal service facility and manually actuable to effect derivation of a corresponding service code in an access mode and to effect derivation of a number signal in an interactive mode;

a speech and signaling network coupled with said console control circuit to said telephone system line and having a DTMF input and a mute function input;

a dual tone multi-frequency (DTMF) decoder network coupled with said console control circuit to said telephone system line and having a digital output;

memory means for receiving and retaining account codes and personal service facility telephone numbers; and control means coupled with said memory means, said service request switches, said speech and signaling network, said DTMF input and mute function input and said DTMF decoder network, responsive to a program mode input for entering a programming mode, responsive in said programming mode to an applied select service code, an applied predetermined telephonic access number, and an applied account code corresponding with said account code data for effecting their transfer to said memory means, responsive in the presence of said off-hook state to a first received service request switch service code for entering said access mode and, during said access mode, accessing said memory means for corresponding said account code and corresponding said predetermined telephonic access number for effecting the calling and telephonic communication with a select and service facility at said predetermined telephonic access number and subsequently responsive to the receipt of said access protocol code from said select service facility as a said digital output from said DTMF decoder network for effecting the transmission of said account code;

said console control circuit being responsive to one of said alarm signals to block access of said telephonic handset to said telephone system line during said select digital telephonic communication.

13. The system of claim 12 in which:

said control console circuit includes an energizable and visually perceptible handset activity indicator at said display; and including electrical coupling means connected intermediate said hook switch and said console control circuit for effecting the energization of said handset activity indicator in the presence of said off-hook state.

* * * * *